Oct. 31, 1933.         W. D. FOSTER         1,932,401
FILM HOLDER
Filed Oct. 6, 1930
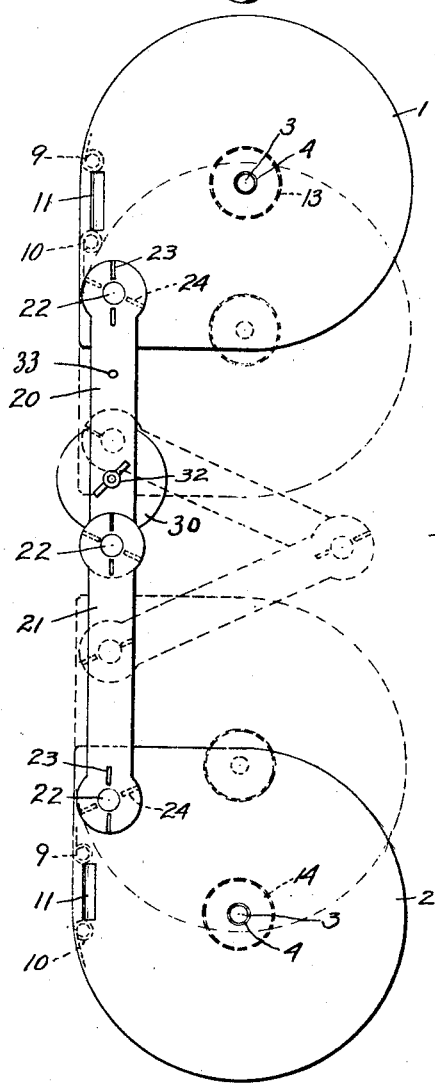
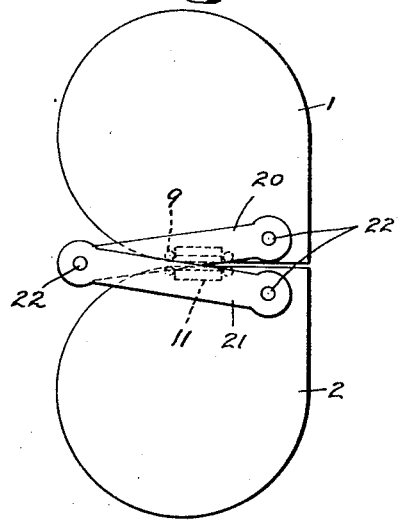
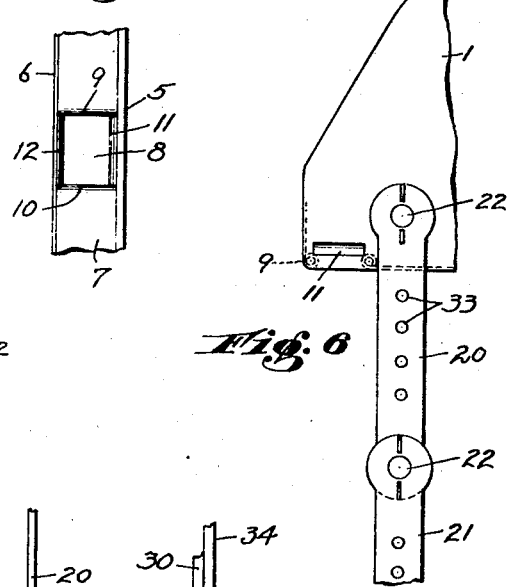
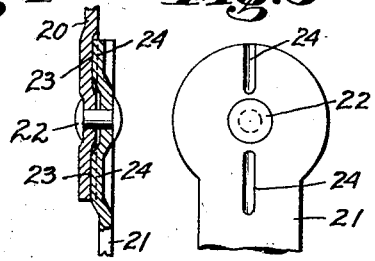
INVENTOR.
WARREN DUNHAM FOSTER.
BY Waldo G. Morse
ATTORNEY Patented Oct. 31, 1933

1,932,401

UNITED STATES PATENT OFFICE 1,932,401

FILM HOLDER

Warren Dunham Foster, Washington Township, N. J., assignor to Kinatome Patents Corporation, New York, N. Y., a corporation of New York Application October 6, 1930. Serial No. 486,711

18 Claims. (Cl. 88—17)

The present invention relates broadly to film holders or magazines and more particularly to holders for films of the type adapted to have a series of images, negative or positive, pictorial or representing sound, produced thereon either independently or in continuous succession, or of the type having a series of stable images thereon adapted to be projected for the reproduction of pictorial images or images representing sound.
A principal object of the present invention is to provide a film holder which can be instantly adapted to the requirements of various types of film handling apparatus in which the spindles are positioned at different distances from each other or in different angular relations to each other or to the aperture past which the film is fed therebetween. I have provided a holder constructed of two film enclosing connected casings, between which a film may be fed, movable to an adjacent position wherein the film is completely protected, or to a plurality of relatively distant positions, wherein a light passage is provided therebetween and different lengths of film are exposed therebetween and the openings of each casing are disposed and locked in different angular relations to each other, such an arrangement constituting an improvement over the film holder described and claimed by Herbert George Ponting and George William Ford in United States in Patent Number 1,440,173, dated December 26, 1922. An analogous object of the present invention is the provision of a protective film holder of the compactness, effectiveness and simplicity of such Ponting and Ford film holder which can be used upon apparatus primarily designed for the conventional large open reels without the sacrifice of such qualities. A further object is the provision of means whereby a film magazine may be supported and positioned independently of the supporting spindles which penetrate such magazine and independently of any mechanism which is constructed as a part of the film handling apparatus, such an arrangement obviously permitting the use of such a magazine with any of various types of film handling apparatus independently of the construction of the apparatus itself, thus obviously increasing the supply of films available to the owner of an apparatus which does not possess the particular positioning or supporting mechanism which may be required for certain types of magazines.

It has been proposed in the co-pending application of Barton Allen Proctor, Serial Number 332,296, filed January 14, 1929, to provide a film handling apparatus in which a delivery or a rewinding spindle and a take-up spindle each of which, together with its driving and control mechanism, can be moved to a plurality of positions so that open reels or magazines of various diameters may be employed thereupon. Such structure has proved very satisfactory under many conditions, but the use of the present magazine provides a compact, simple, and inexpensive device which can be employed, for example, upon apparatus designed for conventional open reels of seven inches in diameter accommodating 400 feet of 16 millimeter film or upon apparatus designed for four-inch closed containers, thus avoiding the necessity for the use of the necessarily relatively expensive Proctor structure to which reference has just been made.

Other objects, advantages, and characteristics are apparent from the following description, the attached drawings, and the sub-joined claims. Although I am showing but one embodiment of my invention, it will readily be understood that I am not limited to one construction as changes can readily be made without departing from the spirit of my invention or the scope of my broader claims.

In the drawing:

Figure 1 is a side view of my container showing in full line its position of maximum extension and in dotted line its position at a point of alternative extension;

Figure 2 shows my magazine with the two containers in adjacent or protective relation;

Figure 3 is a detailed view of the film opening which I may employ for the containers;

Figures 4 and 5 are detailed and enlarged views of the locking hinge for the connecting members;

Figure 6 is a partial view corresponding to Figure 1 showing a preferred modification;

Figure 7 is an enlarged detailed view of one means for positioning and supporting the magazine independently of the film supporting spindles or any mechanism attached to or carried by the film handling apparatus.

In carrying out my invention I provide a magazine comprising two largely enclosed independent containers 1 and 2 containing respectively the opening 4 into which the spindle 3 of the film handling apparatus may be introduced. As is clearly shown in Figure 3, each of such containers preferably is formed of two flat plates 5 and 6 maintained in spaced parallelism to each other by a connective or edge member 7. In actual practice it has been found effective to make the side piece 6 and the member 7 of one stamping and to apply the side 5 thereto as a cover. In making such stamping or in constructing the member 7, if such member is made independently, the aperture 8, through which the film extends is formed. In constructing the member 7, it has been found desirable in some cases to make the opening 8 the full width of the member 7 and to roll the metal inwardly and backwardly as indicated at 9 and 10 in Figures 1 and 3 and in making the side plates 5 and 6 to stamp depressions 11 and 12 respectively in such plates, such depressions forming smooth surfaces which constitute the edges of the aperture and limit the film against lateral movement and such rolls forming a smooth surface against which the top or the bottom of the film touch prior and subsequent to the feeding operation. By this construction a smooth friction-reducing round edge element is economically provided at each of the four sides of the film opening 8. The economy and efficiency of the foregoing construction will be evident.

Within each container, there may be placed the film hubs 13 and 14, which may be of any desired characteristic as, for example, those described and claimed in the co-pending application of Barton Allen Proctor, Edith Dunham Foster, and Clarkson Ulysses Bundick, Serial Number 332,882, filed January 16, 1929.

To connect the above described containers, I preferably make use of a plurality of hinged members 20 and 21, which may be used upon one or both sides of the containers. One end of each of such members is hinged to one of the containers and the other end of each thereof is hingedly connected to the other. As is clearly illustrated in Figures 4 and 5, such hinges may consist of the pivot 22 which is illustrated as a simple rivet. Adjacent such pivotal point, one of such members is formed with depressions such as illustrated at 23, and the other of such members is formed with protuberances such as indicated at 24, such protuberances 24 obviously cooperating with such depressions 23 to lock the members 20 and 21 in the desired relation to each other. Similar formations may be used to lock the containers and the ends of each of the members adjacent thereto. As clearly illustrated in Figure 1, such locking arrangement is effective to maintain the two containers in the position shown in dotted line. It will readily be understood also that the containers 1 and 2 may readily be swung upon the respective hinges so that the angular relations of the openings 8 may be anything which is desired. Thus, to bring the film holder into an operative or work position for use with a film handling instrument of one type, the containers are first moved from the position shown in Figure 2 to that shown in full line in Figure 1 and then each container swung relatively to the members 21 and 20 respectively until the detent formations 23 and 24 thereupon coincide, the apertures 8 of each container then being disposed at such an angle relative to the other, to the inner film-support, and to the operable parts of the instrument that the feeding of the film from one container to the other can conveniently be carried out. It will be noted from inspection of Figures 1 and 2 that the above described construction and arrangement of the members 20 and 21 permit them to be relatively long for increasing the working range of the holder without adding to the overall width or length of the holder since the arms 20 and 21 fold compactly together as shown in Figure 2 and do not project beyond the containers at either end. Figure 6 illustrates another position of such openings relative to each other and the connecting members, useful in apparatus of another type. It will readily be understood, that the number and arrangement of the detents may be made to correspond to the particular instruments with which the holder is to be used. Each one of the three hinges may be provided with detents permitting the containers to be locked in a number of different work positions, i. e. film-winding relations, or in a protective relation as illustrated in Figure 2. It can be seen that provision of the herein described means for rigidifying the connections of the arms 20 and 21 with each other and with the containers 1 and 2 and locking the containers in the specified relations to each other will hold the containers against angular movement on two usual spindles whereby the film openings 8 will, in any work position of the containers, be properly positioned relative to the spindles to permit the film readily passing through the openings without unnecessary bending of the film as it is moved along its usual work path from one container to the other.

In Figures 6 and 7 is illustrated in detail means for positioning the magazine independently of the film supporting spindles 3 which are introduced into the aperture 4. If reliance is placed upon such spindles for supporting or positioning the containers, obviously the inner film hub or reel may drag against the enclosing container 1 or 2 and the container is certain to ride upon the spindle or upon the inner film support or both, thus putting strain upon the film and preventing its free operation. Supporting mechanism, such as is described and claimed for example in my co-pending application, Serial Number 332,840, filed January 16, 1929, or that described and claimed in the co-pending application of Barton Allen Proctor, Serial Number 332,879, filed January 16, 1929, which Proctor application is divisional from his application, Serial Number 54,910, filed September 8, 1925, may be employed, but obviously such structures depend on the addition of mechanism to the film handling apparatus. Under many conditions, it is desirable that the positioning or supporting of the magazine be accomplished from the magazine itself, without any especial construction of the apparatus or addition thereto.

For such purposes, a vacuum cup such as illustrated in detail at 30 in Figure 7 attached to the hinged plate 20 by the shaft 31 and the thumb screw 32 is effective. The hinged plates 20 and 21 may be formed with a series of openings 33 so that the user may attach the vacuum cup to the one of such openings which is particularly convenient for the particular apparatus with which he wishes to use the magazine, the cup portion 30 bearing against a convenient flat side 34 of the apparatus and supporting the magazine in relation thereto. Such attaching arrangement can be so placed that the light channel which is created between the containers when in remote relation to each other is not impeded.

Certain of the objects and advantages of my invention have been stated in the above description. Other advantages include the provision of a film magazine comprising two substantially closed containers which may be placed in adjacent relation to each other whereby the film is completely protected for transportation or storage or disposed and locked in a plurality of relatively distant positions relatively to each other whereby different lengths of film may be exposed therebetween and different angular relations between the openings of such containers provided so that cooperation may be secured between such magazines and a plurality of differently arranged film handling instruments, provision also being made for the support of such magazines relatively to such apparatus by means independent of the film supporting spindles and of any special structure of the apparatus.

I claim:

1. In a film holder, two film receiving containers for a film extending therebetween, spindle receiving openings therein, adjustable connections between said containers cooperating with said containers for maintaining said holder in a first position, in which said containers are disposed in extended relation whereby a light passage is afforded therebetween and through such section of the film extending between said containers and said openings are arranged for cooperation with spindles disposed at a given distance from each other, and in a second position, in which said containers are maintained in adjacent relation to each other for completely protecting the film, and in a third position, intermediate said first and second positions, in which such light passage is provided and said openings are arranged for cooperation with spindles disposed at a distance from each other less than said first mentioned distance, and latching devices associated with said connecting means and effective upon said containers, upon the disposition thereof in said positions.

2. For use in a film handling machine, a film holder comprising two containers each having a film opening in its periphery, and spindle receiving openings in at least one of its sides, a connective member extending from each of said containers, a pivotal connection joining each of said members with the container from which it extends, and a pivotal connection joining said members to each other, said peripheral openings being so disposed relatively to said first mentioned pivotal connections that the angular relation of each of said peripheral openings to its associated connection will remain the same when the positions of the containers are changed to accommodate different disposition of the operating parts in different film handling machines and the disposition of such peripheral openings relatively to said second mentioned connection being such as to bring said openings into adjacent relation when said containers are swung together upon such connection to a film protective position.

3. A film container comprising two flat plates, a member joining said plates to hold them apart in spaced parallelism to each other a distance exceeding the width of the film, said member forming the edge of said container, an opening in said member through which a film may be fed from or to said container, and inwardly extending depressions formed in each of said plates adjacent said opening so disposed as to form the sides of said opening and to limit the lateral movement of the film as it is fed therethrough.

4. A film container comprising two flat plates, a member joining said plates in spaced parallelism to each other and thereby forming the edge of said container, the ends of said member being rolled back upon themselves at a distance from each other so that top and bottom friction-reducing edges for said opening are formed between which a film may be fed from or to the interior of said container, and inwardly extending rounded beads formed in each of said plates adjacent said opening so disposed as to form two friction-reducing side edges for said opening and to limit the lateral movement of the film as it is fed therethrough.

5. In combination, a film holder including two containers and adjustable devices for maintaining said containers in a plurality of positions, a film handling apparatus including a flat plate, and means for supporting said holder upon said apparatus, said means comprising a vacuum cup device, attached to said adjustable devices, adapted to grip said plate.

6. In combination, a film handling apparatus, a film holder, said holder comprising two substantially closed containers and means connecting said containers for holding them in spaced relation to each other, said means including a plurality of members each having a plurality of mounting holes spaced apart along its longitudinal axis, and a supporting member extending from said connecting means to said apparatus and adapted to engage said apparatus and support said holder upon said apparatus, said supporting member being arranged for engagement in any one of said holes whereby said containers may be supported by said member in any one of a plurality of positions.

7. In combination, a film handling apparatus, said apparatus including a flat plate, two film containers, each container including an outer protective casing and an inner film carrying member, said casing and said member having coaxial openings for the reception of a supporting spindle positioned upon said apparatus, and means for supporting said casings upon said apparatus independently of said spindles whereby free movement of said members within said casings is permitted, said means including a vacuum cup adapted to cooperate with said flat plate, and members rigidly connecting said containers and supported by said vacuum cup.

8. In a film-holder adapted for use with a plurality of different types of film-handling machines, the combination of two substantially closed movably-interconnected film-enclosing containers, between which a film extends, movable to one work position wherein they are disposed for cooperation with one of said types of machines and to another work position wherein they are disposed for cooperation with another of said types of machines, and means upon said film-holder rendered effective for locking said container in either of such positions upon the movement of said container to either of such positions.

9. In a film-holder adapted for use with a plurality of different types of film-handling apparatus, the combination of two substantially closed containers for a film extending therebetween, means movably interconnecting said containers, means for locking said containers in one work position wherein they are disposed for cooperation with one of said types of apparatus, and means for locking said containers in another work position wherein they are disposed for cooperation with another of said types of apparatus, each of said locking means including elements disposed upon said interconnecting means and said containers which elements are brought into operative relation one with another upon the movement of said containers upon said interconnecting means into each of such work positions.

10. In a film holder, in combination, two sheet metal containers, and means effective for locking said containers in a plurality of work positions wherein they are held in substantially rigid relation one to the other and are disposed in spaced relation to each other, said means including a plurality of stiff metallic link members pivotally connected to each other and to each of said containers, said links and said containers being formed with cooperating embossed elements and groove elements adjacent the pivotal connecting points of said links and said containers, the associated embossed elements and groove elements being so positioned that the engagement of one with the other determines said work positions of said film holder.

11. A film-holder comprising two substantially closed containers and means attached to said containers and extending therebetween and embodying a lazy-tongs device for movably interconnecting said containers.

12. A film-holder comprising two substantially closed containers and means attached to said containers and extending therebetween for adjustably interconnecting said containers, said means including a plurality of members, means for movably mounting one of said members in relation to each of said containers, and means for movably mounting each of said members in relation to the others thereof.

13. In a film-holder, two film-enclosing containers and means adjustably interconnecting said containers, said means including two members, means for movably connecting one end of one of said members with one of said containers, means for movably connecting the other end of said member with one end of said other mentioned member, and means for movably connecting the other end of said last previously mentioned member with said other container.

14. In a film-holder, two flat film-enclosing containers and means adjustably interconnecting said containers, said means comprising two flat links disposed between said containers, a pivotal connection between one of said links and one of said containers, a pivoted connection between the other of said links and the other of said containers, a pivoted connection between each of said links and the other, and detent means positioned cooperatingly on each of said links for maintaining said links in predetermined position relatively to each other upon the movement of said links.

15. In a film-holder adapted for use with a plurality of different film-handling machines each having a differently disposed predetermined work path, the combination of two substantially closed containers each having a spindle-receiving opening and an opening through which a film may pass freely along a work path when said holder is in operative position on the spindles of any of said machines, and adjustable arms extending from one of said containers to the other and including devices for locking each container in a plurality of positions relative to the other so disposed that when both containers are mounted on the spindles of any of said machines said openings are disposed in the work path of said film for that machine.

16. A film holder for use with a plurality of film handling machines including, in combination, two substantially closed containers each having coaxial apertures for mounting therein a reel for a film to be fed from one of said reels to the other along a predetermined work path, and an opening for said film positioned so that said film may pass from the enclosed reel through said opening and along said work path, means for disposing and locking said containers in one work position for cooperation with the spindles of one of said film handling machines, and separate means for disposing and locking said containers in another work position for cooperation with the spindles of another of said film handling machines wherein said containers are so disposed in relation to each other that there is secured approximately the same angular relations between the spindle apertures and the film openings as there were secured in connection with the first named means, such angular relation resulting in a minimum of bending of the film.

17. In a film holder, the combination of two substantially closed containers, a spindle receiving opening in each of said containers, adjustable means extending between said containers and cooperating therewith for maintaining said containers in a first predetermined work position relatively distant from each other whereby passage for light therebetween is provided and said openings are adapted for cooperation with spindles disposed at one distance from each other and for maintaining said containers in a second predetermined work position relatively distant to each other whereby such a light passage is provided and said openings are adapted for cooperation with spindles disposed at a distance from each other different from said first mentioned distance, said means including a latching device.

18. In a film-holder adapted for use with a plurality of different types of film-handling machines, the combination of two substantially closed movably-interconnected film-enclosing containers, between which a film extends when said containers are spaced apart, movable to one work position wherein they are spaced apart and disposed for cooperation with one of said types of machines and to another work position wherein they are spaced apart and disposed for cooperation with another of said types of machines and to a protective position wherein they are disposed in adjacent relation for protecting the film for shipment and storage, and means upon said film-holder rendered effective for locking said container in any of such positions upon the movement of said container to any of such positions.

WARREN DUNHAM FOSTER.